United States Patent [19]

Hatakeyama et al.

[11] Patent Number: 4,884,601

[45] Date of Patent: Dec. 5, 1989

[54] APPARATUS FOR LOADING COSMETIC MATERIAL INTO A CONTAINER AND SOLIDIFYING SAID COSMETIC MATERIAL

[75] Inventors: Yoshiharu Hatakeyama; Mitsuo Ishiguro, both of Tokyo, Japan

[73] Assignee: Yoshida Industry Co., Ltd., Tokyo, Japan

[21] Appl. No.: 239,745

[22] Filed: Sep. 2, 1988

Related U.S. Application Data

[62] Division of Ser. No. 13,423, Feb. 11, 1987, Pat. No. 4,817,686.

[30] Foreign Application Priority Data

Feb. 17, 1986 [JP] Japan ................................ 61-30688
Feb. 17, 1986 [JP] Japan ................................ 61-30689

[51] Int. Cl.[4] ................................ B29J 5/00
[52] U.S. Cl. ................................ 141/71; 100/90; 425/410; 425/412; 141/12; 141/73; 141/80
[58] Field of Search .................... 100/90, 118; 141/12, 141/71, 73, 80, 81, 98; 264/101, 109, 267, 269; 425/410, 412

[56] References Cited

U.S. PATENT DOCUMENTS

| | | | |
|---|---|---|---|
| 2,573,141 | 10/1951 | Heinrich | 100/90 |
| 2,834,048 | 5/1958 | Wright | 425/412 X |
| 3,602,136 | 8/1971 | Ligh | 141/80 |
| 3,675,570 | 7/1972 | Mersfelder | 100/90 |
| 4,374,796 | 2/1983 | Ogasawara et al. | 264/101 |
| 4,660,608 | 4/1987 | Arai | 141/12 |
| 4,817,686 | 4/1989 | Hatakeyama et al. | 141/12 |

*Primary Examiner*—Ernest G. Cusick
*Attorney, Agent, or Firm*—Wenderoth, Lind & Ponack

[57] ABSTRACT

Loading and solidifying of a cosmetic material is achieved by supplying a viscous cosmetic material into a container having a slidable bottom plate, closing an upper open end of the container by a presser, compressing the cosmetic material by pressing the bottom plate of the container upwardly, and squeezing solvent from the cosmetic material through a porous absorbent element secured in either the presser or a supporting block. The container includes a frame in which the bottom plate is slidably fitted. The supporting block has a recess to hold the container and a drive for pressing the bottom plate upwardly. The supporting block and/or the presser has a hollow space maintained at sub-atmospheric pressure, and the porous absorbent element is secured in the hollow space at a position adjacent the container.

13 Claims, 7 Drawing Sheets

APPARATUS FOR LOADING COSMETIC MATERIAL INTO A CONTAINER AND SOLIDIFYING SAID COSMETIC MATERIAL

BACKGROUND OF THE INVENTION

The present invention relates to an apparatus for loading a viscous cosmetic material into an inner cup of a compact or other container and for solidifying the cosmetic material loaded therein.

Method and apparatus of this kind is disclosed in Japanese Patent Publication No. 57-60004. The method disclosed therein comprises the steps of mixing powder cosmetic material with a solvent to form viscous cosmetic material, injecting the viscous cosmetic material under pressure into an inner cup of a compact or the like, and at the same time having the solvent in the cosmetic material absorbed into an absorbent material in order to solidify the cosmetic material. This improves operation efficiency and the external appearance of the products considerably, when compared with the conventional method wherein powder cosmetic material added with adhesive but not with a solvent is loaded into a container and is compressed by pressing means, or with the method wherein cosmetic material dissolved in a solvent is poured into a container and left to solidify by evaporation of the solvent. Specifically, the method and apparatus of Japanese Patent Publication No. 57-60004 is as follows. A container having a filling hole at the bottom is placed in a recess of a supporting block. An injection nozzle on the supporting block is then tightly fitted to the filling hole, and a porous absorbent block is pressed against the upper open end of the container with a mesh fabric interposed therebetween. With the apparatus thus arranged, viscous cosmetic material is injected under pressure through the nozzle into the container. During this injection operation, the solvent in the cosmetic material is absorbed through the mesh fabric into the porous absorbent block, thereby solidifying the cosmetic material.

In the above prior art arrangement, however, the inside space of the container is always communicated to the injection nozzle during the injection operation, resulting in that the solvent continuously being supplied from the viscous material in the nozzle as the porous block absorbs the solvent in the container. Therefore, a considerable amount of the solvent necessarily remains in the cosmetic material even after the above operation, which solvent often causes, when evaporating, a non-smooth surface such as cracks of the cosmetic material. Further, during the absorbing and solidifying process, even the cosmetic material in the nozzle is partly solidified, which tends to close the nozzle and to develop, after the cosmetic material is completely solidified, unevenness of color or luster of the cosmetic products.

In addition, loading the cosmetic material under pressure requires that the filling hole of the container should be formed at a precise position with accurate dimensions and exactly fitted to the nozzle. Otherwise, the cosmetic material injected under pressure from the nozzle would leak out of the hole and thereby cause waste of the material.

Accordingly, an object of the present invention is to provide an apparatus for loading a cosmetic material into a container and solidifying the same, wherein solvent in the viscous cosmetic material may be efficiently absorbed so as to prevent cracks and unevenness of color and of luster of the final products.

Another object of the present invention is to provide an apparatus of the above type which will prevent any leakage of the cosmetic material when loaded and solidified.

SUMMARY OF THE INVENTION

According to the present invention, a cosmetic material is loaded into a container and solidified by providing the same starts with the step of providing a container having an upper open end and comprising a frame forming a side wall and a bottom plate slidably fitted in the frame. A viscous cosmetic material is prepared by mixing a powder cosmetic material with a solvent, and a predetermined amount thereof is dripped or supplied into the container from its upper open end. The container is then disposed in compression means including a supporting block and a presser, at least one of which has a porous absorbent element adjacent the container. After the upper open end of the container is tightly closed by the lower surface of the presser, the cosmetic material is compressed by pressing the bottom plate upwardly relative to the frame of the container. During this compression, the solvent is squeezed out from the cosmetic material through the porous absorbent element.

Preferably, a liquid absorbent membrane is interposed between the upper open end of the container and the lower surface of the presser.

In one embodiment of the invention, the porous absorbent element is secured to the presser and faces the liquid absorbent membrane so that the solvent is soaked into the porous absorbent element through the liquid absorbent membrane.

In another embodiment of the invention, the bottom plate of the container is formed to be permeable to the solvent. The porous absorbent element is secured to the supporting block in contact with the lower surface of the bottom plate so that the solvent is soaked into the porous absorbent element through the bottom plate.

The invention may further provide for subjecting the porous absorbent element to a vacuum during the compression of the cosmetic material, The invention provides an apparatus to be used in combination with a container for loading a cosmetic material therein and solidifying the cosmetic material. The container has an upper open end and comprises a frame forming a side wall and a bottom plate slidably fitted in the frame. The apparatus includes means for preparing a viscous cosmetic material and for dripping or supplying a predetermined amount thereof into the container. A supporting block has a recess formed therein to hold the container in place and drive means for pressing the bottom plate upwardly relative to the frame of the container. A presser has a lower surface of a dimension to close the upper open end of the container whereby the upward movement of the bottom plate compresses the cosmetic material between the bottom plate and the lower surface of the presser. At least one of the supporting block and the presser has formed therein a hollow space connected to vacuum means for maintaining sub-atmospheric pressure in the hollow space. The apparatus further comprises a porous absorbent element secured in the hollow space at a position adjacent the container for soaking the solvent thereinto upon compression of the cosmetic material.

The bottom plate of the container is preferably in the form of a dish having the lower surface normally positioned below a level of the lower end of the frame.

In one embodiment of the invention, the bottom plate is permeable to the solvent so that the solvent is soaked through the bottom plate into the porous absorbent element which is disposed in the supporting block below the container.

Other objects, features and advantages of the present invention will be apparent from the following detailed description of preferred embodiments thereof when taken in conjunction with the accompanying drawings.

DETAILED DESCRIPTION OF THE INVENTION

Figure 1:
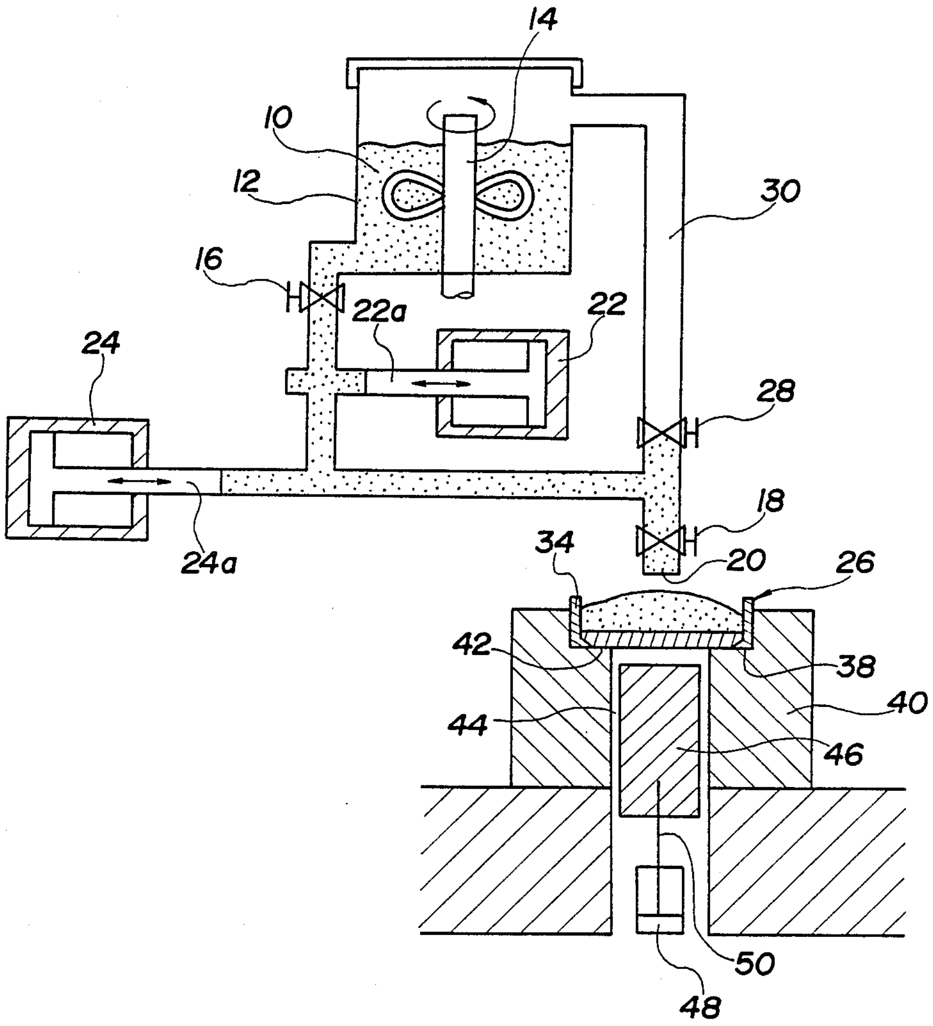
FIG. 1 is a schematic sectional view of a dispensing device and a supporting block in an apparatus according to a first embodiment of the present invention, showing a filling process of cosmetic material into a container.

FIG. 1 shows a process of filling a predetermined amount of viscous cosmetic material into a container. Powder cosmetic material is dissolved in a solvent to make a viscous cosmetic material 10 which is stored in a tank 12 and is mixed therein by a mixing rod 14 with a valve 16 closed. By opening the valve 16, the viscous cosmetic material 10 flows out to a valve 18 located at a discharge opening 20. Next, a piston rod 22*a* of an air cylinder 22 is extended to stop the viscous cosmetic material 10 from flowing out from the tank 12. In this state, extending a piston rod 24*a* of an air cylinder 24 with the valve 18 open extrudes a predetermined amount of viscous cosmetic material from the discharge opening 20 into a container 26. Further, with the valve 18 of the discharge opening 20 closed and with a valve 28 open, the viscous cosmetic material 10 can be circulated through a pipe 30 to render uniform the viscosity of the cosmetic material 10.

The container 26, which is for example an inner cup of a compact, comprises a frame 34 forming a side wall and a bottom plate 36 slidably fitted in the frame 34. The frame 34 has a collar 38 at the lower end to hold the bottom plate 36 in place. The upper edge of the frame 34 defines the open end of the container 26.

Figure 2:
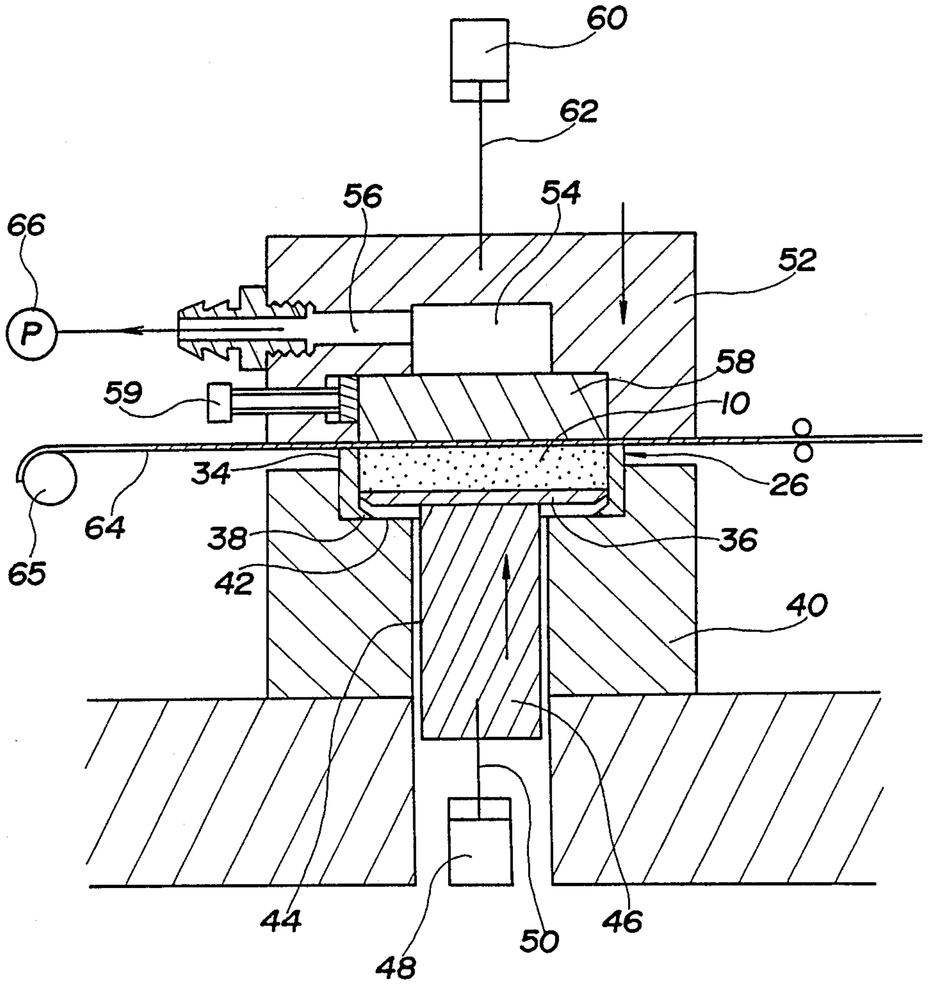
FIG. 2 is a schematic sectional view of the supporting block shown in FIG. 1, combined with a presser, showing a solidifying process of the cosmetic material.
Figure 3A:
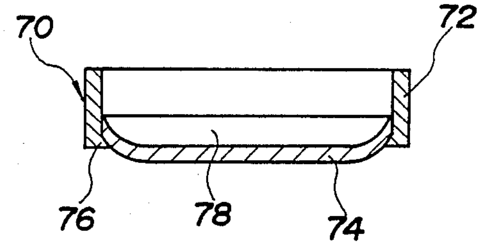
FIGS. 3 (A) to 3 (D) are sectional views showing another example of the container.
Figure 3C:
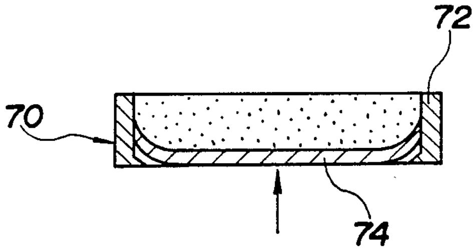
Figure 3B:
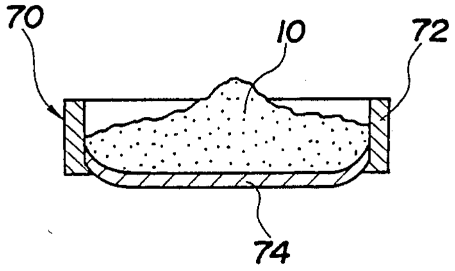
Figure 3D:
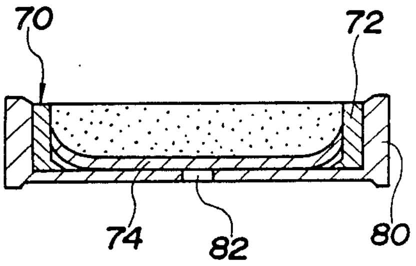
Figure 4A:
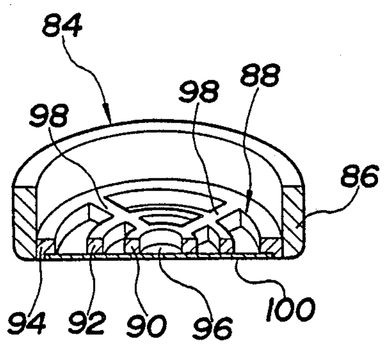
FIGS. 4 (A) to 4 (D) are sectional views showing still other examples of the container.
Figure 4B:
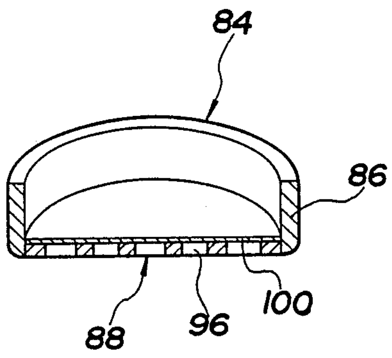
Figure 4C:
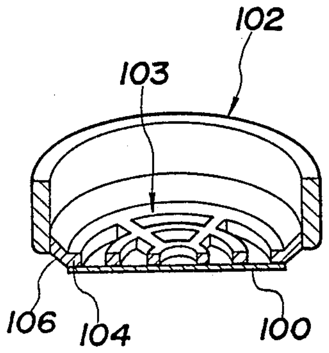
Figure 4D:
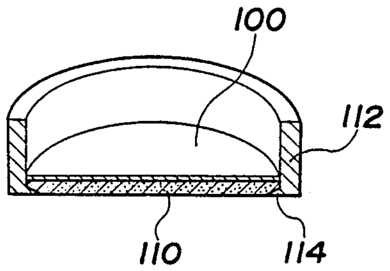

A supporting block 40 has a recess 42 into which the container 26 fits. A cylindrical space 44 extends through the supporting block 40 from the center of the bottom of the recess 42 to the bottom of the supporting block 40, and a press rod 46 is received in the space 44. The press rod 46 is connected to an air cylinder 48 through a piston rod 50. The supporting block 40 is adapted to be moved by, for example, a rotating arm (not shown) which grips the supporting block 40. After the container 26 is placed in the recess 42 and positioned directly under the discharge opening 20, a predetermined amount of the viscous cosmetic material 10 is filled into the container 26 as shown in FIG. 1. Thereafter, the supporting block 40 with the container 26 fitted in the recess 42 is moved for a subsequent solidification step and is combined with a presser 52 as shown in FIG. 2.

The presser 52 has defined therein a hollow space 54 and a vacuum suction passage 56 connected to the hollow space 54. A porous absorbent block 58 formed of sintered metals, ceramics or the like is secured in the hollow space 54 by means of a bolt 59 and has a lower flat surface of an area sufficient to cover the upper open end of the container 26. The presser 52, connected to an air cylinder 60 through a piston rod 62, is slidable in the vertical direction..

The solidifying process is performed as follows. The container 26 filled with the predetermined amount of the viscous cosmetic material 10 is covered with a liquid absorbent membrane 64 which is intermittently fed from a supply roller 65, and the presser 52 including the porous absorbent block 58 is lowered by the air cylinder 60 until the lower surface thereof is in press-contact with the upper edge of the frame 34 through the liquid absorbent membrane 64. Then, the bottom plate 36 of the container 26 is raised relative to the frame 34 by the press rod 46 connected to the air cylinder 48, so that the viscous cosmetic material 10 is compressed between the liquid absorbent membrane 64 and the bottom plate 36. Simultaneously, the hollow space 54 in the presser 52 is subjected to vacuum through the passage 56 connected to a vacuum pump 66.

During the compression of the viscous cosmetic material 10, the solvent contained therein is squeezed out and immediately absorbed by capillary action into the membrane 64 and the porous block 58. The hollow space 54, to which the porous block 58 is faced, is maintained at sub-atmospheric pressure by the vacuum pump 66 and the squeezed-out solvent is discharged outwardly through the passage 56, so that the solvent absorption, i.e. the solidification of the cosmetic material, is promoted. Accordingly, the compression force applied to the viscous cosmetic material 10 may be smaller than a pressure under which the material is injected into the container in accordance with the prior art method as discussed hereinabove.

After the solidifying process, the press rod 46 is lowered and the presser 52 is raised such that the container 26 may be removed from the supporting block 40. Thereafter, the absorbent membrane is wound by winding means (not shown) for a predetermined length so that an unused part of the membrane will be ready for the next cycle.

The membrane may be formed of absorbent paper, cloth and the like and is intended to serve as a packing to prevent the cosmetic material from leaking over the upper end of the container 26 during the compressing process, and to serve as a parting agent, thereby preventing the cosmetic material from sticking to the lower surface of presser 52 after the solidifying process. The membrane 64, when in a wet state, easily comes off from the cosmetic material without injuring a smooth surface thereof.

Another example of a container suitable for use in the present method is illustrated in FIGS. 3(A)–3(D). The container 70 of this example may be an inner cup of a compact and comprises a frame 72 forming a side wall and a bottom plate 74 slidably fitted in the frame 72. The frame 72 has at the lower end thereof an inwardly projecting collar 76 for holding the bottom plate 74 in place. The bottom plate 74 is in the form of a dish defining an inner space 78 with the lower surface of the plate being normally positioned below the level of the lower edge of the frame 72, as seen in FIG. 3 (A). Thus, the container 70 has a depth larger than that of the container 26 in FIG. 2.

After the viscous cosmetic material 10 is supplied into the container 70 (FIG. 3 (B)), the bottom plate 74 is moved upward relative to the frame 72 (FIG. 3 (C)) whereby the cosmetic material is compressed and solidified with use of the devices 40 and 52 of FIG. 2. During this operation the volume of the cosmetic material is reduced due to removal of the solvent, and the elevated bottom plate 74 compensates for such reduction by decreasing the space within the container 70. In FIG. 3 (C) the lower surface of the bottom plate 74 is at the same level as the lower edge of the frame 72, which can be ensured by adjusting the volume of the viscous cosmetic material 10 supplied from the device of FIG. 1. Thus, when the container 70 is fitted in a compact 80 as shown in FIG. 3 (D), the bottom plate 74 is maintained at this particular position where the cosmetic material entirely fills the container 70.

The compact 80 is illustrated to have formed at the bottom thereof a slot 82 which permits a press member (not shown) to be inserted therethrough for pressing the bottom plate 74 upwardly. This makes it possible to keep the upper surface of the cosmetic material at the level substantially as shown in FIG. 3 (D) for convenience in use even when a considerable amount of the material has been consumed.

Figure 5:
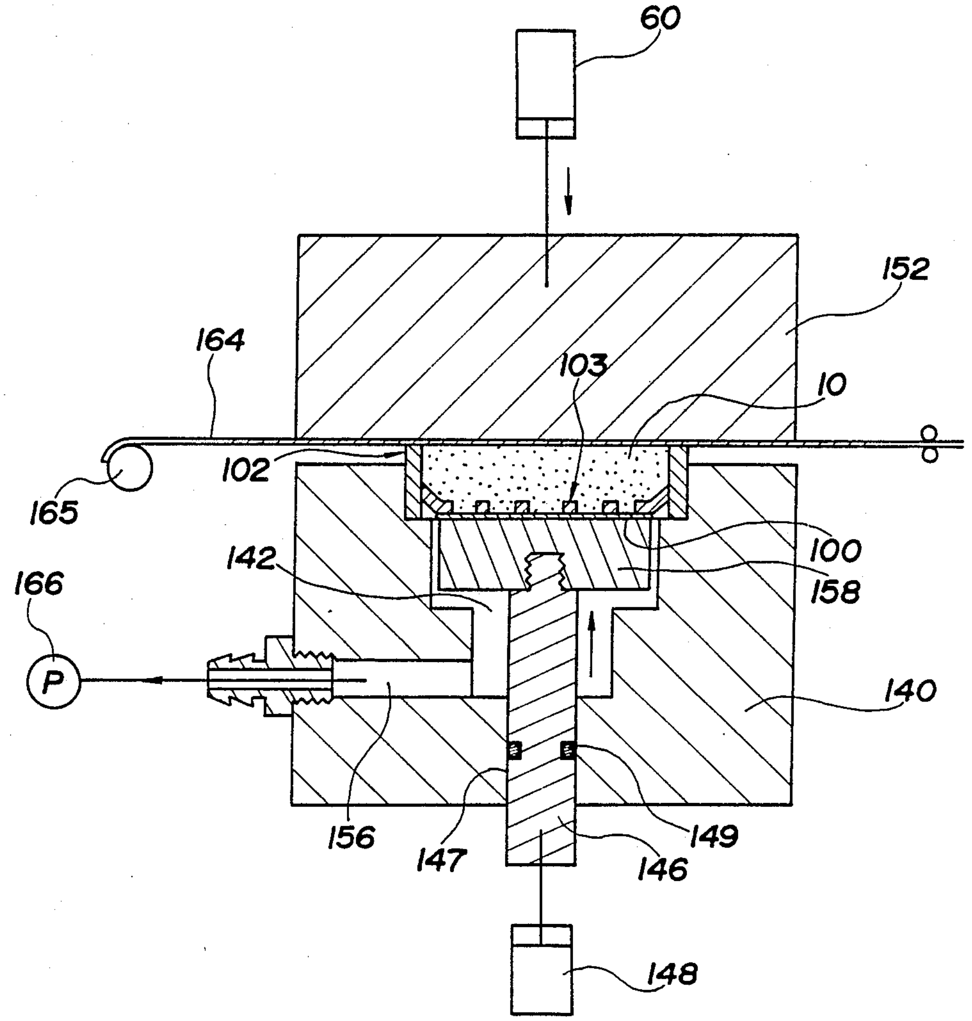
FIG. 5 is a schematic sectional view of an apparatus according to a second embodiment of the present invention.

FIG. 5 illustrates another embodiment of the solidifying apparatus according to the invention, in which may be used containers as shown in FIGS. 4(A)–4(D). A container 84 of FIG. 4 (A) includes an annular frame 86 and a bottom plate 88 slidably fitted in the frame 86. The bottom plate 88 comprises ring shaped beams 90, 92 and 94 which are arranged concentrically to form annular spaces 96 therebetween, and radial beams 98 integrally connecting the ring beams. Adhered to the lower surfaces of these beams is a liquid absorbent sheet 100 made, for example, of mesh fabric, woven cloth, unwoven or blotting paper. The sheet may be adhered to the upper surfaces of beams, as shown in FIG. 4 (B). A container 102 of FIG. 4 (C) is similar to the above container 84 except that an outermost ring shaped beam 104 of a bottom plate 103 has a flange 106 which is inclined upwardly toward the frame to thereby position the beams at a level below the lower edge of the frame. In FIG. 4 (D) a bottom plate 110 is formed of a porous absorbent material such as porous plastics, sintered metals and ceramics, with the sheet 100 being adhered to the upper surface thereof. A frame 112 is provided at the lower edge with a collar 114 for holding the slidable bottom plate 110 in place.

Turning to FIG. 5, the apparatus generally comprises a supporting block 140 and a presser 152 movable in the vertical direction by an air cylinder 60 or other suitable device. The supporting block 140 has on its upper surface a recess into which the container is tightly fitted. In the illustrated embodiment the container 102 of FIG. 4 (C) is used. Slidably received in a hollow space 142, which is a smaller-diametered section of the recess, is a porous absorbent member 158 threadedly engaged with a press rod 146 which extends through a bore 147 and is connected to a drive such as an air cylinder 148 for vertical movement. The press rod 146 has an O-ring 149 fitted on the outer periphery thereof in such a manner as to permit sliding of the rod while preventing flow of air through the bore 147 into the hollow space 142. A passage 156 is provided in the block 140 to connect the hollow space 142 to a vacuum pump 166, so that the space 142 may be maintained at sub-atmospheric pressure.

The presser 152 is in the form of a solid mass having a lower surface of an area sufficient to close the upper open end of the container 102. A liquid absorbent membrane 164 is supplied from a roller 165 and extends between the supporting block 140 and the presser 152, as in the above embodiment.

For performing a solidifying operation, after the presser 152 is lowered until its lower surface is in press-contact with the upper edge of container 102 for closing the opening through the membrane 164, the press rod 146 presses the porous member 158 upward which in turn elevates the bottom plate 103 relative to the frame while compressing the viscous cosmetic material 10. A part of the solvent squeezed from the material is absorbed by the membrane 164, but most of the solvent is soaked into the porous member 158 through the annular spaces of the bottom plate 103 and the sheet 100. The porous member 158 is subjected to vacuum during the compressing operation, which promotes the solidification of the cosmetic material.

Figure 6:
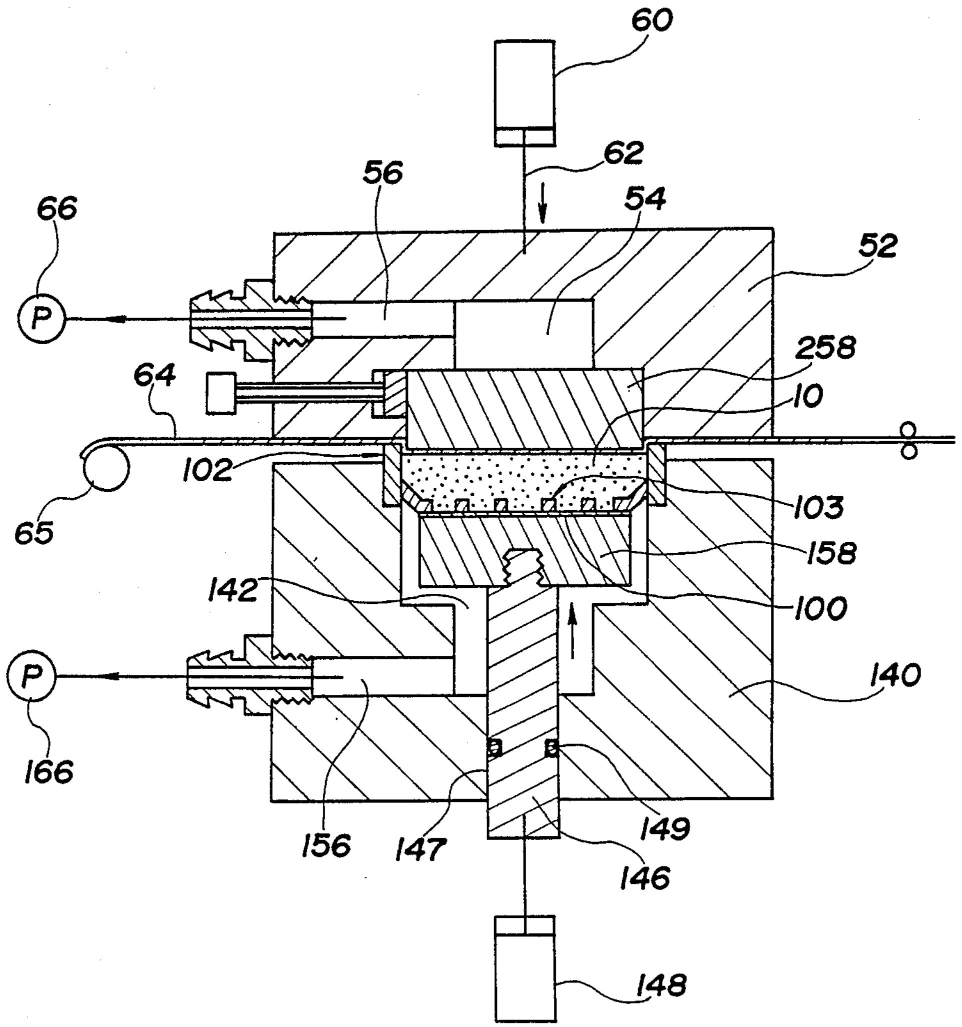
FIG. 6 is a view similar to FIG. 5 illustrating an apparatus according to a third embodiment of the present invention.

An apparatus as shown in FIG. 6 substantially is a combination of the presser unit 52 of FIG. 2 and the supporting block unit 140 of FIG. 5. In this embodiment, however, a porous absorbent block 258 secured in the space 54 of the presser 52 slightly protrudes from the lower surface of the presser 52 so that during the solidifying operation, the porous block 258 fits into the container 102 and slightly compresses the cosmetic material 10. Accordingly, the solvent is sucked and squeezed out through both the upper and lower ends of the container much more efficiently than the above embodiments, and efficiency is further increased through the slight compression by the porous block 258.

Figure 7A:
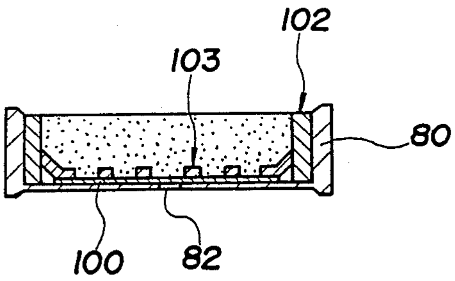
FIGS. 7 (A) and 7 (B) are sectional views showing a manner of mounting the containers in a compact.
Figure 7B:
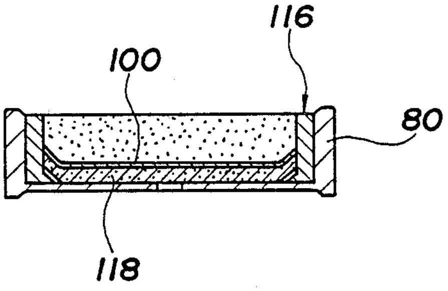

The container 102, after being removed from the solidifying apparatus, can be mounted in the compact 80 having the slot 82 as shown in FIG. 7 (A), with the bottom plate 103 being in the elevated position. Thus, the same advantage as discussed in connection with the container 70 in FIG. 3 may be achieved. A similar arrangement is illustrated in FIG. 7 (B) in which a container 116 has a flanged bottom plate 118 formed of porous material like the example of FIG. 4 (D).

From the foregoing description, it will be apparent that there is no leakage nor waste of the cosmetic material when loading the same according to the present invention because the proper amount of the viscous cosmetic material can be extruded or dripped into the container. Further, since the viscous cosmetic material is compressed between the presser and the bottom plate which is slidable within the frame of the container in the vertical direction so that the solvent is readily squeezed out from the viscous cosmetic material, and since the squeezed out solvent is immediately subjected to vacuum through the liquid absorbent membrane and the porous block, the solidifying efficiency of the cosmetic material is remarkably increased. A relatively low compression force is sufficient to squeeze the solvent out and to solidify the cosmetic material. Further, the cosmetic material, after being pressed, contains substantially no solvent which would otherwise cause cracks, unevenness of color and/or luster when evaporating. Therefore, the final products may present excellent appearance.

Although the present invention has been described with reference to the preferred embodiments thereof, many modifications and alterations may be made within the spirit of the invention.

What is claimed is:

1. An apparatus in combination with a container for loading therein a cosmetic material having a solvent and solidifying said cosmetic material, said container having an upper open end and comprising a frame forming a side wall and having an upper edge and a bottom plate slidably fitted in said frame, and said apparatus comprising:

means for preparing a viscous cosmetic material and for dripping a predetermined amount of aid cosmetic material into said container;

a supporting block having a recess formed therein to hold said container in position;

a presser having a flat and smooth lower surface of a dimension larger than a dimension of said frame of said container for closing said upper open end thereof, said lower surface, upon closing said upper open end, being positioned at the level of said upper edge of said frame;

drive means in said supporting block for pressing said bottom plate of said container upwardly relative to said frame, whereby the upward movement of said bottom plate compresses said cosmetic material between said bottom plate and said lower surface of said presser such that the upper end of said cosmetic material is formed flat and flush with said upper edge of said frame;

at least one of said supporting block and said pressure having formed therein a hollow space, vacuum means connected to said hollow space for maintaining sub-atmospheric pressure in said hollow space; and a porous absorbent element secured in said hollow space at a position adjacent said container such that the solvent from the cosmetic material is absorbed into said porous absorbent element upon compression of said cosmetic material.

2. A combination as claimed in claim 1, further comprising a liquid absorbent membrane interposed between said supporting block and said presser, said lower surface of said presser, upon closing said upper open end, abutting against said upper edge of said frame with said liquid absorbent membrane therebetween, and wherein said hollow space is formed in said presser and said porous absorbent element faces said liquid absorbent membrane, the lower end of said porous absorbent element forming a part of said lower surface of said presser.

3. A combination as claimed in claim 2, wherein said drive means in said supporting block includes a press rod movable in a vertical direction, said press rod having an upper end to abut the lower surface of said bottom plate for pressing said bottom plate toward said liquid absorbent membrane.

4. A combination as claimed in claim 1, wherein said bottom plate of said container is permeable to the solvent, said hollow space is formed in said supporting block below said recess, and said porous absorbent element is slidably received in said hollow space to abut the lower surface of said bottom plate, whereby the solvent is absorbed into said porous absorbent element through said bottom plate.

5. A combination as claimed in claim 4, wherein said bottom plate of said container comprises a plurality of beams forming openings therebetween and a liquid absorbent sheet adhered to said beams for covering said openings.

6. A combination as claimed in claim 5, wherein said bottom plate further includes an inclined flange adjacent said frame for normally positioning the lower surface of said bottom plate at a level below the lower end of said frame, said lower surface of said bottom plate being raised to above said level when said cosmetic material is compressed.

7. A combination as claimed in claim 4, wherein said bottom plate is formed of a porous absorbent material.

8. A combination as claimed in claim 4, wherein said drive means in said supporting block includes a press rod movable in a vertical direction, said press rod having an upper end connected to said porous absorbent element for movement therewith to thereby press said bottom plate upwardly by means of said porous absorbent element.

9. A combination as claimed in claim 8, wherein said supporting block has formed therethrough a bore opened to said hollow space, and said press rod extends through said bore in an air-tight manner.

10. A combination as claimed in claim 9, further comprising a liquid absorbent membrane interposed between said supporting block and said presser, said lower surface of said presser, upon closing said upper open end of said container, abutting said upper edge of said frame with said liquid absorbent membrane therebetween.

11. A combination as claimed in claim 10, further comprising a second hollow space formed in said presser and maintained at sub-atmospheric pressure, and a second porous absorbent element fixedly secured in said second hollow space for absorbing solvent thereinto through said liquid absorbent membrane, the lower end of said second porous absorbent element forming a part of said lower surface of said presser.

12. A combination as claimed in claim 1, wherein said frame of said container has formed at the lower end thereof an inwardly projecting collar for holding said bottom plate.

13. A combination as claimed in claim 12, wherein said bottom plate of said container is in the form of a dish having a lower surface which is normally positioned below the level of the lower end of said frame and is raised to said level when said cosmetic material is compressed.

* * * * *